United States Patent
Barney et al.

(10) Patent No.: US 6,652,950 B2
(45) Date of Patent: Nov. 25, 2003

(54) THERMAL INSULATING CONFORMAL BLANKET

(75) Inventors: Andrea Barney, Bedford, MA (US); Charles A Whittington, Gardena, CA (US); Bryan Eilertson, Huntington Beach, CA (US); Zenon Siminski, Bellflower, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/072,793

(22) Filed: Feb. 6, 2002

(65) Prior Publication Data

US 2003/0145773 A1 Aug. 7, 2003

(51) Int. Cl.[7] ................................................. B32B 5/22
(52) U.S. Cl. ....................... 428/102; 442/262; 428/902; 428/905
(58) Field of Search .................. 428/102, 902, 428/905; 442/262

(56) References Cited

U.S. PATENT DOCUMENTS

| | | |
|---|---|---|
| 5,038,693 A | 8/1991 | Kourtides et al. |
| 5,362,527 A | 11/1994 | Harpell et al. |
| 5,436,042 A | 7/1995 | Lau et al. |
| 5,609,912 A | 3/1997 | Lackey et al. |
| 5,626,951 A | 5/1997 | Hogenson |

*Primary Examiner*—Alexander S. Thomas
(74) *Attorney, Agent, or Firm*—DiPinto & Shimokaji, P.C.

(57) ABSTRACT

The conformal thermal insulating blanket may have generally rigid batting material covered by an outer insulating layer formed of a high temperature resistant woven ceramic material and an inner insulating layer formed of a woven ceramic fiber material. The batting and insulating layers may be fastened together by sewing or stitching using an outer mold layer thread fabricated of a high temperature resistant material and an inner mold layer thread of a ceramic fiber material. The batting may be formed to a composite structure that may have a firmness factor sufficient to inhibit a pillowing effect after the stitching to not more than 0.03 inch. The outer insulating layer and an upper portion of the batting adjacent the outer insulating layer may be impregnated with a ceramic coating material.

13 Claims, 3 Drawing Sheets

THERMAL INSULATING CONFORMAL BLANKET

GOVERNMENT RIGHTS

This invention described herein was made in the performance of work under NASA Cooperative Agreement NCC2-9015 and is subject to the provisions of Section 305 of the National Aeronautics and Space Act of 1958 (72 Stat. 435: 42 U.S.C. 2457).

BACKGROUND OF THE INVENTION

This invention relates to thermal insulation used in high temperature aerospace vehicle applications. The new thermal insulating conformal blanket is constructed by incorporating an initially generally rigid batting material with surface layers fastened to provide a lower cost, reusable insulating device.

Use of thermal insulating devices is known in the aerospace industry. This subject has been extensively investigated under NASA direction, as is evidenced in U.S. Pat. No. 5,038,693. The patent discloses the investigation of various batting materials, surface layers, and threads for stitching the materials together. While these investigations have produced notable results in materials development, a thermal insulation blanket for replacement of high temperature ceramic tiles for thermal protection on aerodynamic surfaces has not been discovered.

A primary impediment to the development of a less expensive, as compared to ceramic tile, thermal blanket product is the necessity that the outer surface of any insulation be relatively smooth to avoid aerodynamic drag and associated aerodynamic heating. U.S. Pat. No. 5,626,951 discloses materials that may be useful in developing a thermal insulating blanket. However, as in the case of other stitched blanket designs, the problem of establishing a near net shape manufacturing process using existing materials is not solved. The batting in the prior art is not structured to easily manufacture a stitched blanket that inhibits the undesired resultant pillowing effect, as well as other surface roughness features thus precluding its use on high temperature aerodynamic surfaces.

As can be seen, there is a need for a manufacturable, reliable, and affordable thermal insulating conformal blanket for use in replacing expensive ceramic tiles used on aerospace vehicles as an example.

SUMMARY OF THE INVENTION

An improved thermal insulating conformal blanket structure and manufacturing process according to the present invention comprises a firm, rigid ceramic batting material having an outer and inner surface layer material which elements are joined by stitching.

In one aspect of the present invention, an insulating blanket device for use with aerospace vehicles comprises a batting formed from a ceramic fiber material such that the batting may be firm and generally rigid to inhibit pillowing during the processing of the blanket device. The batting may be covered on all sides with an outer insulating layer resistant to high temperature. The batting and insulating layers may be fastened together by sewing or stitching.

In another aspect of the invention, the insulation blanket device comprised of the batting, outer insulating layer and inner insulating layer may have the batting formed to a composite structure that may have a firmness factor sufficient to inhibit a pillowing effect after the stitching operation of not more than about 0.03 inch. The stitching may use an outer mold layer thread of ceramic fiber material to stitch through the outer insulating layer and the batting, and an inner mold layer thread of ceramic fiber material as the bobbin thread to engage the outer mold layer thread.

In yet another aspect of the invention, the insulation blanket device may be processed in a heat cleaning cycle process after the stitching operation to reduce dirt, organics, and debris. The outer insulating layer and an upper portion of the batting adjacent the outer insulating layer may be impregnated with ceramic coating material to form a high temperature composite surface.

In a further aspect of the invention, a method of manufacture of a thermal insulation conformal blanket comprises the steps of fabricating a batting from alumina fiber material to a firmness factor that may inhibit a pillowing effect during stitching to not more than about 0.03 inch. The batting may then be covered with an outer insulating layer formed of woven ceramic fiber material and an inner insulating layer formed of woven ceramic fiber material. The batting and insulating layers may then be stitched together using an outer mold layer thread resistant to high temperature damage to stitch through the outer insulating layer and the batting, and a lower temperature resistant inner mold layer thread as a bobbin thread to form an insulation blanket device. The insulation blanket device may then be heat treated to remove contaminants. Finally, the outer insulating layer and an upper portion of said batting adjacent the outer insulating layer may be impregnated with a ceramic coating to form a high temperature composite surface.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
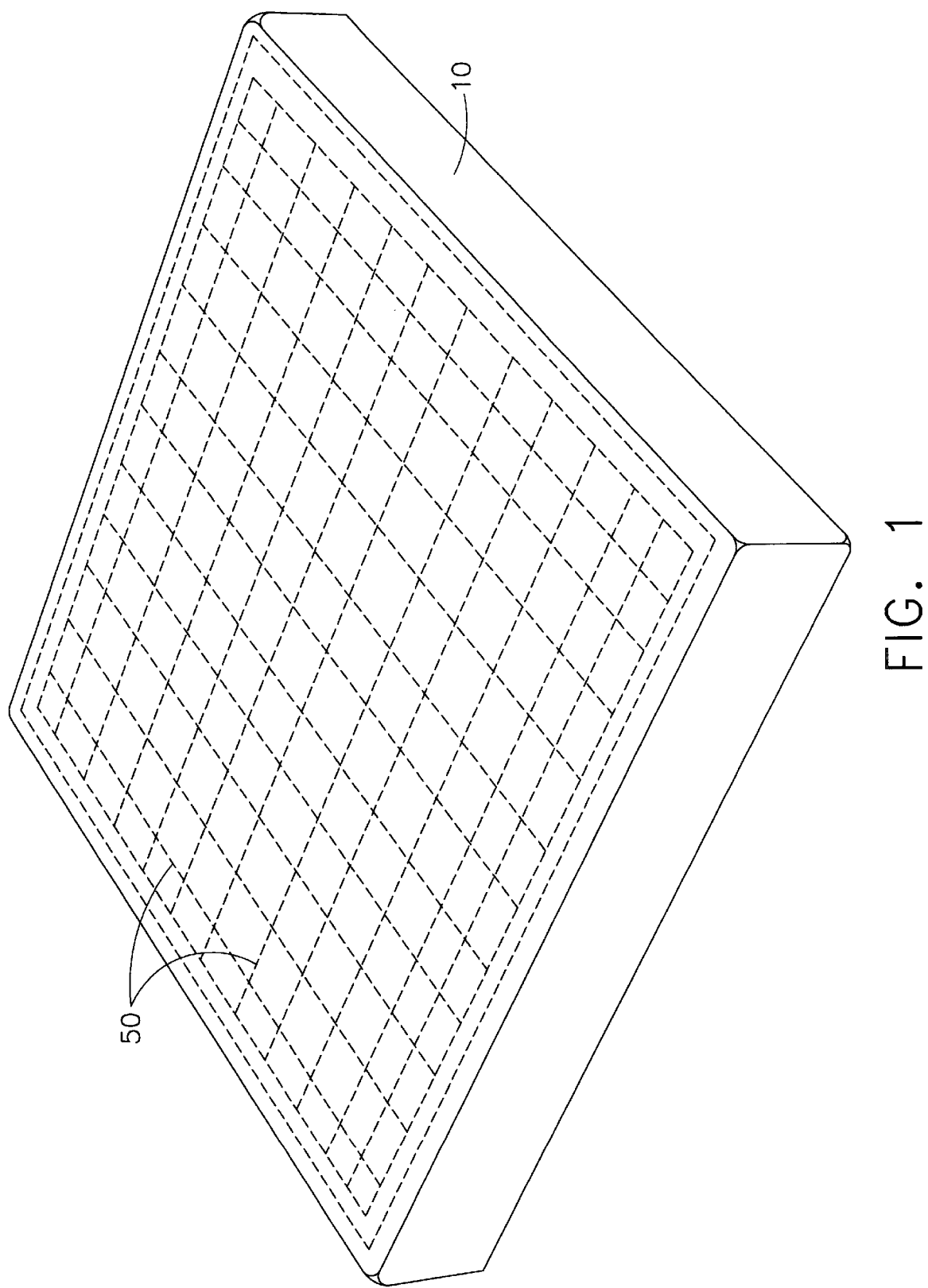
FIG. 1 illustrates a perspective view of an insulating blanket according to an embodiment of the invention.

Referring to FIG. 1, an insulation blanket 10 is illustrated as a generally rectangular box construction fastened with stitching 50 in a rectangular pattern. The insulation blanket 10 in structure may be a firm, generally rigid (allowing limited flexibility) construction that is conformable for use on aerodynamic, high temperature surfaces of aerospace craft as well as for use in other high temperature applications. Further, the material structure of the insulation blanket 10 may provide a durable, resilient and thus reusable thermal insulating outer surface layer for high temperature protection on aerodynamic surfaces.

Figure 2:
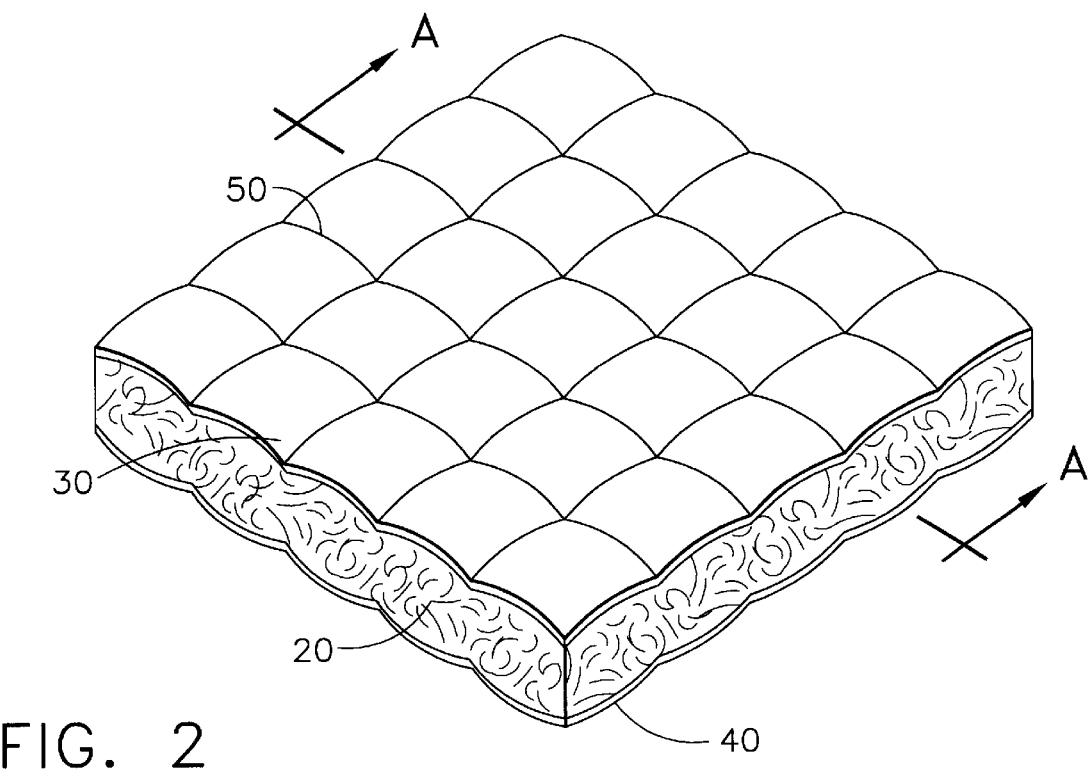
FIG. 2 illustrates a perspective view of a portion of an insulating blanket according to an embodiment of the invention.
Figure 3:
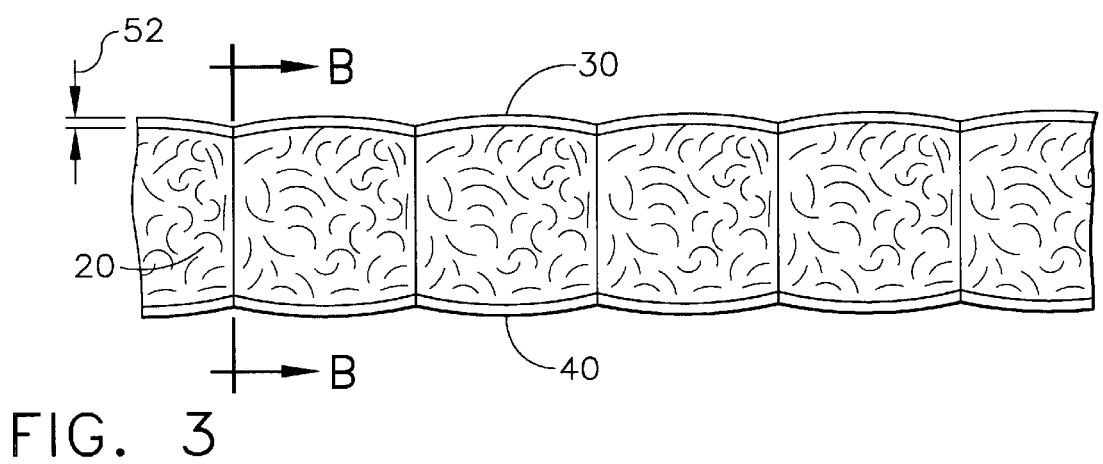
FIG. 3 illustrates a cross section elevation view along lines A—A in FIG. 2 according to an embodiment of the invention.

Referring to FIGS. 2 and 3, a portion of an insulation blanket 10 is illustrated that can have the structure of batting 20 sandwiched between an outer insulating layer 30 and an inner insulating layer 40. Stitching 50 using an outer mold layer thread 36 and an inner mold layer thread 46 may be used to fasten the blanket elements together.

The batting 20 insulating layer may be formed of ceramic fibrous material, such as alumina fibers or combinations of ceramic fibers of alumina, boria, silica and the like. In experiments conducted to fabricate insulating blankets, it was found that a generally rigid alumina batting of alumina fiber material was useful as a base for the stitching operation of blanket construction and provided the desired insulation properties. The generally rigid batting 20 may maintain the desired insulation blanket 10 shape during the sewing process thereby producing a uniform and consistent blanket. The generally rigid, as identified by for example a hardness test using a Shore Durometer type OOO with a minimum value of 90, batting 20 may also facilitate the assembly and fabrication of the insulation blanket 10. This batting 20 structure facilitates cutting, trimming and shaping the batting 20 for ease in conforming to necessary attachment locations on aerospace vehicles and for forming a uniform surface foundation for construction of the insulation blanket 10.

The batting 20 may be covered by an outer insulating layer 30 of a high temperature, approximately 2400° F., ceramic fiber material such as the trade name product NEXTEL 440 and an inner insulating layer 40 of lower temperature, approximately 1200° F., ceramic fiber such as E-glass both of which layers 30, 40 may be of a woven material construction. A high temperature ceramic thread fabricated of NEXTEL 440 may be used as the outer layer stitching material for the high temperature environment and a low temperature, approximately 900° F., ceramic thread such as S-glass may be used for the inner mold layer thread 46. These examples reflect currently available materials; however, as can be understood by those knowledgeable in the art, other refractory materials may be used to construct the thermal insulating blanket.

Figure 4:
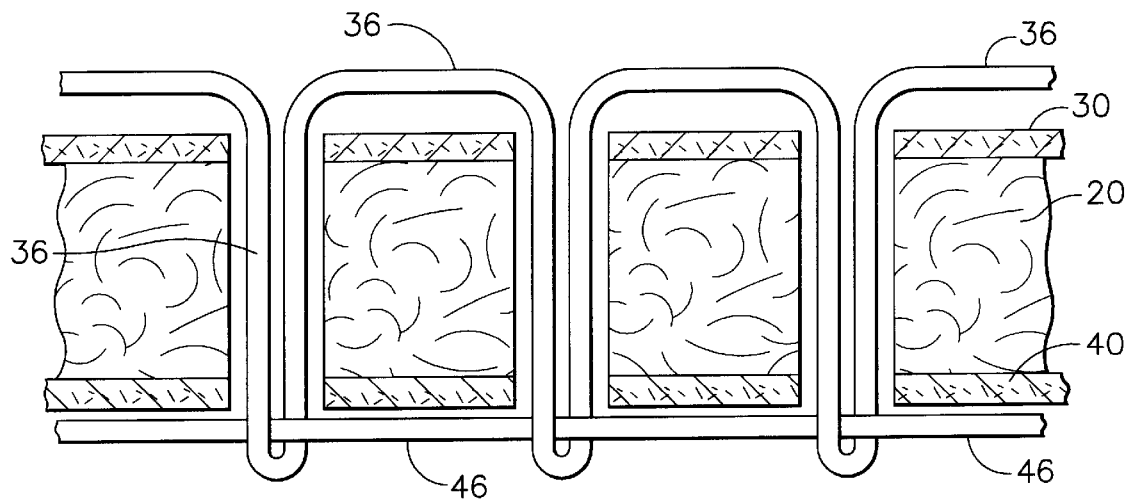
FIG. 4 illustrates a schematic representation of the stitching along lines B—B of FIG. 3 according to an embodiment of the invention.

Referring to FIG. 4, the stitching of the insulation blanket 10 may be accomplished by using known methods such as that used to construct the flexible insulation blankets used on the U.S. Space Shuttle. The outer mold layer thread 36 may serve as the machine needle thread and the inner mold layer thread 46 as the bobbin thread. A square stitch pattern of, for example, one-inch dimension was found by experiment to give desired results for fastening and surface uniformity of the outer insulating layer 30.

Referring again to FIG. 2, the use of a firm, generally rigid ceramic fiber material as the batting 20 may result in a foundation structure for the fabrication process which produces an insulation blanket 10 with a small thickness variation, approximately +/−0.03 inch and with a relatively smooth outer mold line variation 30 approximately +/−0.015 inch. The use of the firm, generally rigid conformal batting 20 structure may solve the problem associated with fabrication of aerodynamically smooth blankets. The insulation blankets 10 may be fabricated in larger sizes than ceramic tiles and may be more durable and flexible, thereby increasing reliability, affordability and reusability.

Figure 5:
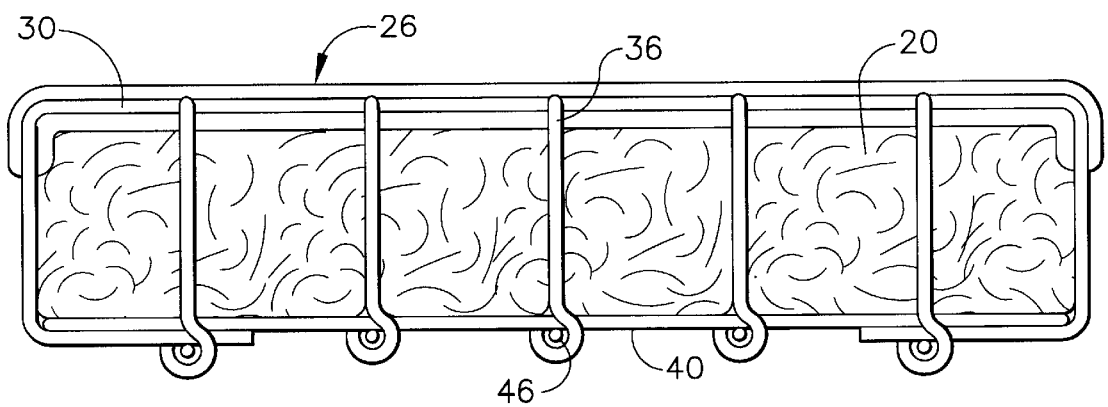
FIG. 5 illustrates a schematic view of the insulation blanket with impregnated outer insulating layer and batting according to an embodiment of the invention.

Referring to FIG. 5, the final step in the fabrication process for the insulation blanket 10 may be the impregnation of the outer insulating layer 30 with a ceramic coating material such as alumina/silica, lanthanum phosphate or the like to form a high temperature composite layer 26. The insulation blanket 10 may also be processed through a heat cleaning cycle to remove dirt, organics and contamination resulting from the construction process to reduce particles. The outer insulating layer 30 with the impregnated composite layer 26 may produce a relatively uniform, temperature resistant surface for the high temperatures experienced on the windward portion of an aerospace vehicle of up to 2200° F.

It should be understood, of course, that the foregoing relates to preferred embodiments of the invention and that modifications may be made without departing from the spirit and scope of the invention as set forth in the following claims.

We claim:

1. A device for use in a thermal insulation system, comprising:

a batting formed from a ceramic fiber material and having a hardness factor with a minimum value of 90 determined by using a Shore Durometer type OOO;

an outer insulating layer and an inner insulating layer covering said batting wherein said outer insulating layer and an upper portion of said batting adjacent to said outer insulating layer is impregnated with a ceramic coating material to form an insulation blanket; and said outer insulating layer, said batting, and said inner insulating layer fastened together by stitching in a square stitch pattern of a one-inch dimension.

2. The device as in claim 1 wherein an outer mold layer thread having a high temperature resistant quality is used to stitch through said outer insulating layer and said batting, and an inner mold layer thread is used as a bobbin thread at the inner insulating layer for said outer mold layer thread.

3. The device as in claim 2 wherein said outer mold layer thread is a ceramic fiber material.

4. The device as in claim 2 wherein said inner mold layer thread is a ceramic fiber material.

5. The device as in claim 1 wherein said ceramic coating material is selected from one of an alumina/silica and a lanthanum phosphate composition.

6. The device as in claim 1 wherein said hardness factor of said batting is sufficient to inhibit a pillowing effect after fastening by said stitching resulting in a thickness variation of said insulation blanket of not more than 0.03 inch.

7. The device as in claim 1 having a smoothness variation of approximately −0.015 inch to +0.015 inch and a surface thickness variation of approximately −0.03 inch to +0.03 inch.

8. The device as in claim 1 wherein after said sewing, said device is processed in a heat cleaning cycle.

9. The device as in claim 8 wherein said heat cleaning cycle removes dirt, organics and debris to reduce contamination.

10. The device as in claim 1 wherein said ceramic fiber material is selected from one of an alumina and an alumina/silica material composition.

11. The device as in claim 1 wherein said outer insulating layer is a ceramic fiber material.

12. The device as in claim 1 wherein said inner insulating layer is a ceramic fiber material.

13. A device for use in a thermal insulation system for elements of aerodynamic vehicles experiencing a high temperature environment comprising:

a batting formed of a material selected from one of an alumina and an alumina/silica fiber material;

an outer insulating layer formed of woven ceramic fiber material and an inner insulting layer formed of woven ceramic fiber material covering said batting;

said outer insulating layer and said inner insulating layer fastened together by stitching using an outer mold layer thread to stitch through said outer insulating layer and said batting, and using an inner mold layer thread of ceramic fiber material as a bobbin thread at said inner insulating layer for said outer mold layer thread;

said batting has a firmness factor sufficient to inhibit a pillowing effect after said stitching resulting in a thickness variation of said insulation blanket of not more than 0.03 inch;

said batting having a hardness factor with a minimum value of 90, as measured with a Shore Durometer type OOO;

said outer insulating layer and said inner insulating layer after said stitching is processed in a heat cleaning cycle wherein the quantity of dirt, organics and debris are reduced;

said outer insulating layer and an upper portion of said batting adjacent said outer insulating layer is impregnated with a high temperature ceramic material to form an insulation blanket; and said insulation blanket having a smoothness variation of approximately −0.015 inch to +0.015 inch and a surface thickness variation of approximately −0.03 inch to +0.03 inch.

* * * * *